(12) United States Patent
Zhang

(10) Patent No.: US 12,460,437 B2
(45) Date of Patent: Nov. 4, 2025

(54) LEAK-PROOF GARBAGE BASKET AND WATER SURFACE CLEANING ROBOT

(71) Applicant: Aiper Global Pte. Ltd., Singapore (SG)

(72) Inventor: Jiaqing Zhang, Suzhou (CN)

(73) Assignee: AIPER GLOBAL PTE. LTD., Singapore (SG)

( * ) Notice: Subject to any disclaimer, the term of this patent is extended or adjusted under 35 U.S.C. 154(b) by 0 days.

(21) Appl. No.: 18/986,329

(22) Filed: Dec. 18, 2024

(65) Prior Publication Data
US 2025/0116129 A1     Apr. 10, 2025

(30) Foreign Application Priority Data

Dec. 29, 2023   (CN) .......................... 202323633968.1

(51) Int. Cl.
*E04H 4/12* (2006.01)
*B63B 35/00* (2020.01)
*B63B 35/32* (2006.01)
*E02B 15/10* (2006.01)

(52) U.S. Cl.
CPC ........... *E04H 4/1263* (2013.01); *B63B 35/32* (2013.01); *E02B 15/10* (2013.01); *B63B 2035/006* (2013.01)

(58) Field of Classification Search
CPC . E04H 4/1263; B63B 35/32; B63B 2035/006; E02B 15/10; C02F 1/40
See application file for complete search history.

(56) References Cited

U.S. PATENT DOCUMENTS

| | | | | |
|---|---|---|---|---|
| 1,516,767 A | * | 11/1924 | Falley | E02B 3/04 405/28 |
| 3,626,486 A | * | 12/1971 | Bugbee | B01D 33/72 210/405 |
| 3,708,070 A | * | 1/1973 | Bell | E02B 15/046 210/923 |
| 4,186,844 A | * | 2/1980 | Swanson | B65F 1/16 220/817 |
| 4,746,424 A | * | 5/1988 | Drew | E04H 4/1263 210/167.2 |
| 5,133,854 A | * | 7/1992 | Horvath | E04H 4/1654 210/167.2 |

(Continued)

FOREIGN PATENT DOCUMENTS

KR       20240097106 A   *   6/2024   ..........  E02B 15/103

*Primary Examiner* — Liam Royce
(74) *Attorney, Agent, or Firm* — VOLPE KOENIG

(57) ABSTRACT

Disclosed herein are a leak-proof garbage basket and a water surface cleaning robot. The leak-proof garbage basket comprises a body with an inlet, where the body is provided thereon with a leak-proof baffle rotatably connected with the body and disposed close to the inlet. when being in a first position, the leak-proof baffle closes at least a partial area of the inlet. The garbage basket has a novel structure where a leak-proof baffle is disposed at the inlet, which can effectively prevent garbage in the garbage basket from overflowing through the inlet of the garbage basket on a condition that the water surface cleaning robot is stopped or moved backwards, and thus accomplish the objective of preventing garbage leakage, guarantee the cleaning effect of the water surface cleaning robot, and improve the user experience.

10 Claims, 2 Drawing Sheets

(56) References Cited

U.S. PATENT DOCUMENTS

| | | | | |
|---|---|---|---|---|
| 5,337,434 A * | 8/1994 | Erlich | ............... | E04H 4/1654 |
| | | | | 15/1.7 |
| 5,861,098 A * | 1/1999 | Morrison | ........... | B01D 17/0208 |
| | | | | 210/801 |
| 2006/0104720 A1 * | 5/2006 | Haski | ................ | G05D 1/247 |
| | | | | 405/60 |
| 2023/0107841 A1 * | 4/2023 | Duffaut | ............ | E04H 4/1263 |
| | | | | 15/1.7 |
| 2025/0092623 A1 * | 3/2025 | Wang | ................ | C02F 1/481 |

* cited by examiner

LEAK-PROOF GARBAGE BASKET AND WATER SURFACE CLEANING ROBOT

FIELD OF THE INVENTION

The present disclosure relates to the technical field of water cleaning devices, and more specifically, to a leak-proof garbage basket and a water surface cleaning robot.

BACKGROUND OF THE INVENTION

With the development of artificial intelligence, a variety of robots have been applied to various industries, which liberate people from manual work and improve people's lives. Water surface cleaning robots are mainly used to collect and clear garbage (e.g. leaves) floating on rivers, lakes, or swimming pools, which can clean the water surface automatically through remote control, or following a certain path, without requiring people to go into the water.

The existing water surface cleaning robot mainly includes a propeller, a roller brush, a garbage basket, and the like. The propeller is configured to drive the cleaning robot to move. The rotating roller brush is configured to collect garbage (e.g. leaves) floating on the water surface into the garbage basket, and after the garbage is collected, the water surface cleaning robot pulls over for clear-up of the garbage basket.

However, when the water surface cleaning robot needs to move backwards, or when the water surface cleaning robot is stopped and kept floating on the water surface, the garbage sometimes overflows from the garbage basket, resulting in garbage leakage, which affects the cleaning effect of the water surface cleaning robot.

SUMMARY OF THE INVENTION

The technical problem to be solved by the present disclosure is: to provide a leak-proof garbage basket, and a water surface cleaning robot comprising the same.

In order to solve the above-mentioned technical problem, the present disclosure utilizes the following technical solution: a leak-proof garbage basket, comprising: a body with an inlet, wherein the body is provided thereon with a leak-proof baffle rotatably connected with the body, and the leak-proof baffle is disposed close to the inlet, and when the leak-proof baffle is at a first position, the leak-proof baffle closes at least a partial area of the inlet.

A density of a material of the at least partial area of the leak-proof baffle is less than a density of water, and/or the leak-proof baffle is provided thereon with an air cavity.

The leak-proof baffle is provided thereon with a counterweight, and on a condition that the leak-proof baffle is at the first position, the counterweight is positioned below a rotation center axis of the leak-proof baffle.

The body is further provided thereon with a roller brush disposed close to the inlet, and when the leak-proof garbage basket is observed in a direction of water flowing through the inlet into the body, the leak-proof baffle at the first position and the roller brush have an overlapping area.

The body is further provided thereon with a limiting feature for limiting a rotation angle range of the leak-proof baffle, and the rotation angle range of the leak-proof baffle 4 is from 0° to 100°, and the leak-proof baffle is at a rotation angle of 0° when being in a horizontal state.

The limiting feature is a limiting bump.

The first position of the leak-proof baffle is arranged such that an angle of the leak-proof baffle is from 80° to 100° relative to a direction away from the inlet.

The body on both ends is provided with the inlet, respectively, and each of the inlets is provided correspondingly with the leak-proof baffle.

In order to solve the above-mentioned technical problem, the present disclosure further employs the following technical solution: a water surface cleaning robot, comprising a robotic body with a hollow cavity, and the leak-proof garbage basket as described above, wherein the leak-proof garbage basket is disposed in the hollow cavity, and on a condition that the water surface cleaning robot is disposed into water, a top of the leak-proof baffle at a first position protrudes from a water level.

The top of the leak-proof baffle at the first position is 5-20 mm above the water level.

The present disclosure has the following advantageous effect: the garbage basket has a novel structure where a leak-proof baffle is disposed at the inlet thereof, which can effectively prevent garbage in the garbage basket from overflowing through the inlet of the garbage basket on a condition that the water surface cleaning robot is stopped or moved backwards, and thus accomplish the objective of preventing garbage leakage, guarantee the cleaning effect of the water surface cleaning robot, and improve the user experience.

Figure 1:
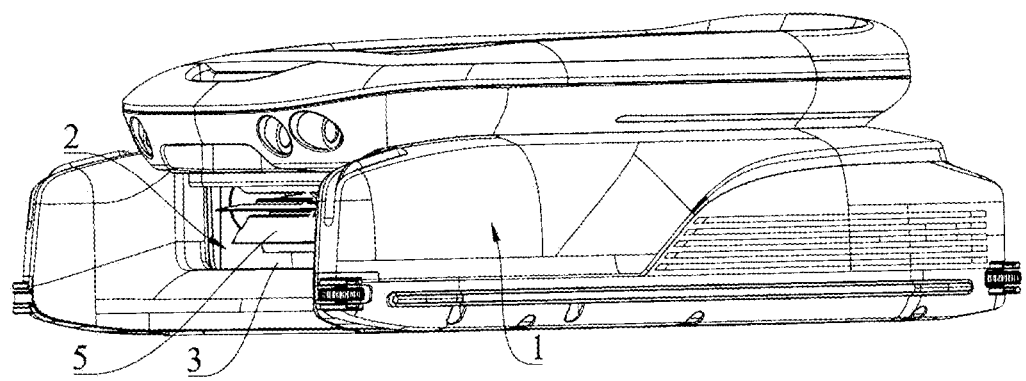
FIG. 1 is a schematic diagram of a structure of a water surface cleaning robot according to Embodiment I of the present disclosure.

DESCRIPTION OF REFERENCE SIGNS 1. robotic body;
2. body;
3. inlet;
4. leak-proof baffle; 41. air cavity; 42. counterweight
5. roller brush;
6. limiting feature;
7. water level.

DETAILED DESCRIPTION OF EMBODIMENTS

In order to make the technical contents, the objective and the effect of the present disclosure apparent, description below will be made in conjunction with the implementations and the accompanying drawings.

Referring to FIGS. 1-4, a leak-proof garbage basket includes a body 2 with an inlet 3. The body 2 is provided thereon with a leak-proof baffle 4 that is rotatably connected with the body 2. The leak-proof baffle 4 is disposed close to the inlet 3, and on a condition that the leak-proof baffle 4 is in a first position, the leak-proof baffle 4 closes at least a partial area of the inlet 3.

It can be seen from the above description that the present disclosure has the following advantageous effect: the garbage basket has a novel structure where a leak-proof baffle 4 is disposed at the inlet 3 thereof, which can effectively prevent garbage in the garbage basket from overflowing through the inlet 3 of the garbage basket when the water surface cleaning robot is stopped or moved backwards, and thus accomplish the objective of preventing garbage leakage, guarantee the cleaning effect of the water surface cleaning robot, and improve the user experience.

The density of the material of the at least partial area of the leak-proof baffle 4 is less than the density of water, and/or the leak-proof baffle 4 is provided thereon with an air cavity 41.

It can be seen from the above description that there are multiple optional arrangements capable of rotating the leak-proof baffle 4 to the first position, thereby making the leak-proof garbage basket more diversified.

Further, the leak-proof baffle 4 is provided thereon with a counterweight 42. On a condition that the leak-proof baffle 4 is in the first position, the counterweight 42 is positioned below a rotation center axis of the leak-proof baffle 4.

It can be seen from the above description that with the arrangement of the counterweight 42, the leak-proof baffle 4 can be rotated more quickly to the first position, enabling the leak-proof baffle 4 to more quickly close the at least partial area of the inlet 3, so as to better prevent the garbage from leaking from the garbage basket.

Further, the body 2 is further provided thereon with a roller brush 5 disposed close to the inlet 3. When the leak-proof garbage basket is observed in a direction of water flowing through the inlet 3 into the body 2, the leak-proof baffle 4 at the first position and the roller brush 5 have an overlapping area.

It can be seen from the above description that, the arrangement of the roller brush 5 enables the garbage basket to better collect garbage.

Further, the body 2 is further provided thereon with a limiting feature 6 for limiting a rotation angle range of the leak-proof baffle 4. The rotation angle range of the leak-proof baffle 4 is from 0° to 100°, and on a condition that the leak-proof baffle is in a horizontal state, the leak-proof baffle 4 is at a rotation angle of 0°.

It can be seen from the above description that, with the limiting feature 6, the operating stability of the leak-proof baffle 4 can be ensured, and the leak-proof baffle 4 can be prevented from being opened reversely, causing the garbage to leak out.

Further, the limiting feature 6 is a limiting bump.

It can be seen from the above description that, the limiting feature 6 has a simple structure and thus can be manufactured easily.

Further, the first position of the leak-proof baffle 4 is arranged such that an angle of the leak-proof baffle 4 is from 80° to 100° relative to a direction away from the inlet 3.

It can be seen from the above description that, such arrangement is advantages for lowering the accuracy requirements for processing and assembling the parts of the leak-proof garbage basket, thereby reducing the manufacturing cost of the leak-proof garbage basket.

Further, the body 2 on both ends is provided with the inlet 3, respectively, and each of the inlets 3 is provided correspondingly with the leak-proof baffle 4.

The water surface cleaning robot includes a robotic body 1 with a hollow cavity, and the leak-proof garbage basket as described above. The leak-proof garbage is disposed in the hollow cavity, and on a condition that the water surface cleaning robot is disposed in water, a top of the leak-proof baffle 4 at a first position protrudes from a water level 7.

It can be seen from the above description that, the garbage in the garbage basket is prevented from leaking out when the water surface cleaning robot is stopped or moved backwards.

Further, the top of the leak-proof baffle 4 at the first position is 5-20 mm above the water level 7.

It can be seen from the above description that, in the case where the top of the leak-proof baffle 4 at the first position is 5-20 mm above the water level 7, garbage leakage can be prevented to a greater extent.

Embodiment I

Figure 2:
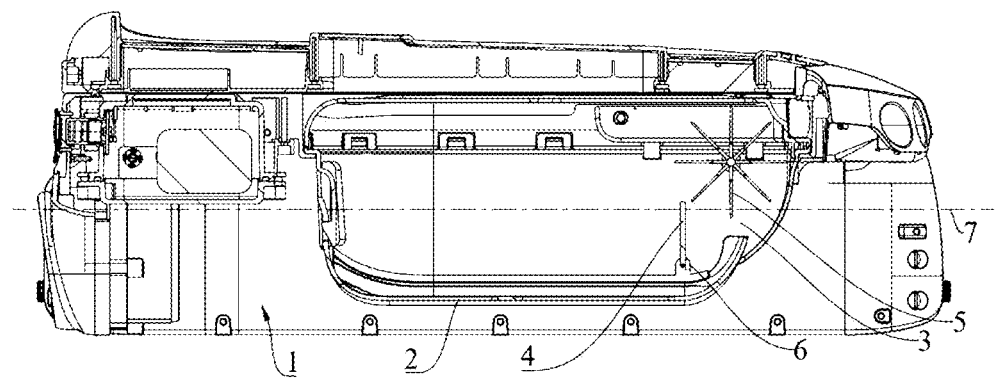
FIG. 2 is a sectional view of a water surface cleaning robot having a first structure according to the Embodiment I of the present disclosure.

Referring to FIGS. 1-4, the Embodiment I of the present disclosure is described as follows: as shown in FIGS. 1 and 2, the water surface cleaning robot includes a robotic body 1 with a hollow cavity, and a leak-proof garbage basket disposed in the hollow cavity; the leak-proof garbage basket includes a body 2 with an inlet 3, where the body 2 is provided thereon with a leak-proof baffle 4 rotatably connected with the body 2 and disposed close to the inlet 3, and on a condition that the leak-proof baffle 4 is in a first position, the leak-proof baffle 4 closes at least a partial area of the inlet 3, to prevent garbage within the body 2 from leaking out via the inlet 3. Specifically, the bottom of the leak-proof baffle 4 is rotatably connected to the body 2 via a shaft, and the water cleaning robot floats on the water surface when placed by a user into the water, and at this time, the top of the leak-proof baffle 4 at the first position protrudes from the water level 7, that is, the top of the leak-proof baffle 4 at the first position is higher than the water level 7 to close the at least partial area of the inlet 3. Preferably, the top of the leak-proof baffle at the first position is 5-20 mm above the water level.

In order to simplify the structure of the leak-proof garbage basket, on a condition that the water surface cleaning robot stops moving forwards and floats on the water surface, the leak-proof baffle 4 is returned to the first position due to its own buoyancy. In an optional embodiment, the density of the material of the leak-proof baffle is less than the density of the water, where the density of the water is 1 g/cm$^3$. When the water surface cleaning robot is moved forwards, the water flow drives the leak-proof baffle 4 to rotate, and the leak-proof baffle 4 is then titled backwards a certain angle, which is equivalent to causing the inlet 3 to open, thus allowing the garbage to enter therein. On a condition that the water surface cleaning robot is kept stationary or moved backwards, the leak-proof baffle 4 is returned to the first position as an effect of the buoyancy or the water flow. At this time, the top of the leak-proof baffle 4 protrudes from the water level 7, thereby preventing garbage from leaking out of the body 2.

Figure 3:
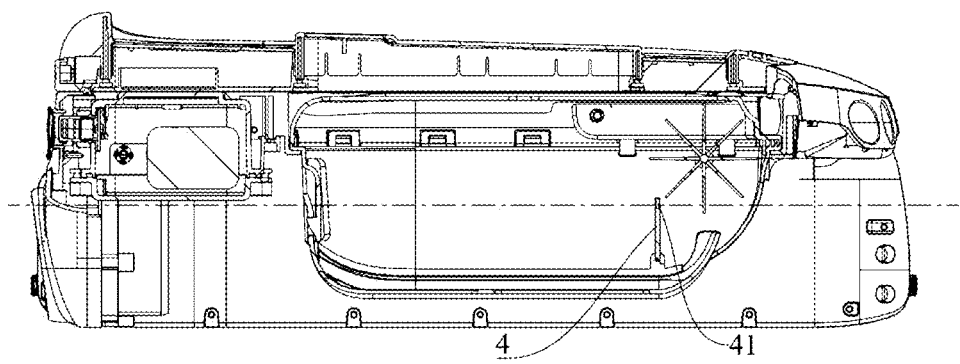
FIG. 3 is a sectional view of a water surface cleaning robot having a second structure according to the Embodiment I of the present disclosure.
Figure 4:
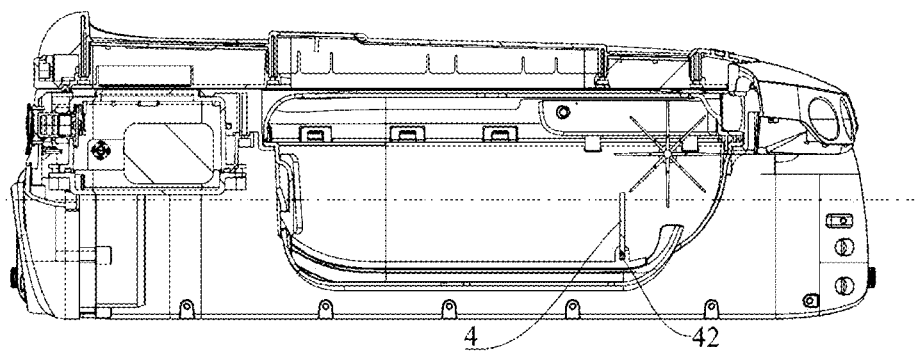
FIG. 4 is a sectional view of a water surface cleaning robot having a third structure according to the Embodiment I of the present disclosure.

In order to let the leak-proof baffle 4 more quickly return to the first position, optionally, the leak-proof baffle 4 is provided thereon with an air cavity 41 (as shown in FIG. 3). It would be appreciated that the density of the material of the leak-proof baffle 4 may be no less than the density of the water. In other embodiments, in order to let the leak-proof baffle 4 more quickly return to the first position, the leak-proof baffle 4 is provided thereon with a counterweight 42 (as shown in FIG. 4). On a condition that the leak-proof baffle 4 is in the first position, the counterweight 42 is located below a rotation center axis of the leak-proof baffle 4. The counterweight 4 may be an additional object, or a partial area of the leak-proof baffle 4 where the density of the material of the leak-proof baffle 4 is greater than the density of the water.

Optionally, the body 2 is provided thereon with a roller brush 5. The roller brush 5 is rotatable relative to the body 2 and disposed close to the inlet 3. When the leak-proof garbage basket is observed in a direction of water flowing through the inlet 3 into the body 2, the leak-proof baffle 4 at the first position and the roller brush 5 have an overlapping area.

In order to guarantee the operating stability of the leak-proof baffle 4, optionally, the body 2 is provided thereon with a limiting feature 6 for limiting the rotation angle of the leak-proof baffle 4. In this embodiment, the limiting feature 6 is a limiting bump.

In an implementation, the rotation angle range of the leak-proof baffle 4 is limited by the limiting feature 6. The rotation angle range of the leak-proof baffle 4 is from 0° to 100°. The leak-proof baffle 4 is at a rotation angle of 0° when being in a horizontal state, and is at a rotation angle of 90° when being in a vertical state. In this embodiment, on a condition that the leak-proof baffle 4 is at an angle from 80° to 100°, the top of the leak-proof baffle 4 protrudes from the water level 7. In other words, in an actual product, the first position of the leak-proof baffle 4 may correspond to a rotation angle range, for example, from 80° to 100°, rather than a definite and individual rotation angle.

In other embodiments, the body 2 at both ends may be provided with the inlet 3, respectively, and each of the inlets 3 is provided correspondingly with the leak-proof baffle 4. At this time, irrespective of moving forwards or backwards, the water surface cleaning robot can collect and clear garbage.

To sum up, the garbage basket provided by the present disclosure has a novel structure where a leak-proof baffle is disposed at the inlet, which can effectively prevent garbage in the garbage basket from overflowing through the inlet of the garbage basket on a condition that the water surface cleaning robot is stopped or moved backwards, and thus accomplish the objective of preventing garbage leakage, guarantee the cleaning effect of the water surface cleaning robot, and improve the user experience. With the arrangement of an air cavity or a counterweight on the leak-proof baffle, the leak-proof baffle can be returned to the first position more quickly, thereby achieving a better effect of preventing garbage leakage.

The description above is only related to the embodiments of the present disclosure, rather than limits the scope thereof. Any equivalent variations made on the basis of the description and the accompanying drawings of the present disclosure, which are directly or indirectly applied to the relevant technical fields, should likewise fall into the protection scope of the present disclosure.

The invention claimed is:

1. A leak-proof garbage basket which is disposed in a cavity of a water surface cleaning robot, comprising:

a body with an inlet,
wherein the body is provided thereon with a leak-proof baffle rotatably connected with the body, and
when the leak-proof baffle rotates to a first position, the leak-proof baffle closes at least a partial area of the inlet, to prevent garbage in the leak-proof garbage basket from overflowing through the inlet;
the body is further provided thereon with a roller brush partly positioned above the leak-proof baffle, and
the roller brush is rotatable relative to the body; and
a rotation center axis of the leak-proof baffle is located below the roller brush.

2. The leak-proof garbage basket of claim 1, wherein a density of a material of at least partial area of the leak-proof baffle is less than a density of water, and/or the leak-proof baffle is provided thereon with an air cavity.

3. The leak-proof garbage basket of claim 1, wherein the leak-proof baffle is provided thereon with a counterweight, and on a condition that the leak-proof baffle is at the first position, the counterweight is positioned below a rotation center axis of the leak-proof baffle.

4. The leak-proof garbage basket of claim 1, wherein when the leak-proof garbage basket is observed in a direction of water flowing through the inlet into the body, the leak-proof baffle at the first position and the roller brush have an overlapping area.

5. The leak-proof garbage basket of claim 1, wherein the body is further provided thereon with a limiting feature for limiting a rotation angle range of the leak-proof baffle, and the rotation angle range of the leak-proof baffle 4 is from 0° to 100°, and the leak-proof baffle is at a rotation angle of 0° when being in a horizontal state.

6. The leak-proof garbage basket of claim 5, wherein the limiting feature is a limiting bump.

7. The leak-proof garbage basket of claim 1, wherein the first position of the leak-proof baffle is arranged such that an angle of the leak-proof baffle is from 80° to 100° relative to a direction away from the inlet.

8. The leak-proof garbage basket of claim 1, wherein the leak-proof baffle rotates due to change in buoyancy.

9. A water surface cleaning robot, comprising a robotic body with a hollow cavity, and the leak-proof garbage basket of claim 1, wherein the leak-proof garbage basket is disposed in the hollow cavity, and on a condition that the water surface cleaning robot is disposed into water, a top of the leak-proof baffle at a first position protrudes from a water level.

10. The water surface cleaning robot of claim 9, wherein the top of the leak-proof baffle at the first position is 5-20 mm above the water level.

\* \* \* \* \*